United States Patent [19]

Reimer

[11] 4,183,163

[45] Jan. 15, 1980

[54] VERSATILE COLLAPSIBLE FISHING ROD

[76] Inventor: Paul Reimer, 29 McLoughlin St., Glen Cove, N.Y. 11542

[21] Appl. No.: 795,214

[22] Filed: Aug. 22, 1977

[51] Int. Cl.[2] .................. A01K 87/00

[52] U.S. Cl. .................. 43/24; 43/18 R

[58] Field of Search .................. 43/18 R, 18 GF, 23, 43/24

[56] References Cited

U.S. PATENT DOCUMENTS

| | | | |
|---|---|---|---|
| 2,324,429 | 7/1943 | Rondelli | 43/18 R |
| 3,862,509 | 1/1975 | Petersen | 43/24 |

*Primary Examiner*—Robert C. Watson

*Attorney, Agent, or Firm*—Charles J. Speciale

[57] ABSTRACT

A versatile fishing rod collapsible upon itself by virtue of being comprised of a plurality of tapered hollow sections each fitting inside the other adaptable to be used for different types of fishing, i.e., casting or non-casting, and provided with interchangeable parts for accomplishing that purpose.

5 Claims, 9 Drawing Figures

W
"X"
"Y"

VERSATILE COLLAPSIBLE FISHING ROD

BACKGROUND OF THE INVENTION

1. Field of the Invention

The present invention relates to improvements in collapsible fishing poles.

2. Description of the Prior Art

Collapsible fishing poles per se are of course known as are collapsible fishing poles with the line running through the hollow interior thereof. For example, those found in U.S. Pat. Nos. 2,776,516; 2,808,676; and 3,862,509. The foregoing while showing these features do not disclose the improvements of the present invention whereby components are provided that are interchangeable or whereby the same components can be utilized to achieve different types of fishing, i.e., casting vs. non-casting, salmon vs. trout, and the like.

SUMMARY OF THE INVENTION

It is therefore, among one of the principle objectives of this invention to provide an improved collapsible (or telescoping) fishing rod.

In accord with the invention there is now provided a versatile fishing rod collapsible upon itself for storage or telescopingly extendible for use which comprises a plurality of tapered hollow sections each fitting inside the other, additional separate handles employable with said sections, an improved line intake opening provided in the butt section according to one embodiment, in the section adjacent to the butt section, and a supplementary butt (line) guide. The fishing rod can be made extra long for fishing for trout in heavily wooded areas where lines can become entangled in what we call "sneak-fishing," or it can be shortened for fly casting for salmon by removing one section (butt) and affixing another handle. The line for the rod may be threaded inside the hollow sections as is, or it can be threaded outside the rod by providing a fourth replacement section (tip) with line guides outside.

BRIEF DESCRIPTION OF THE DRAWING

The invention will be hereinafter more fully described with reference to the accompanying drawing in which.

DESCRIPTION OF THE PREFERRED EMBODIMENTS

Figures 1, 2, 3, 4, 4A, 5, 6, 7, 8:
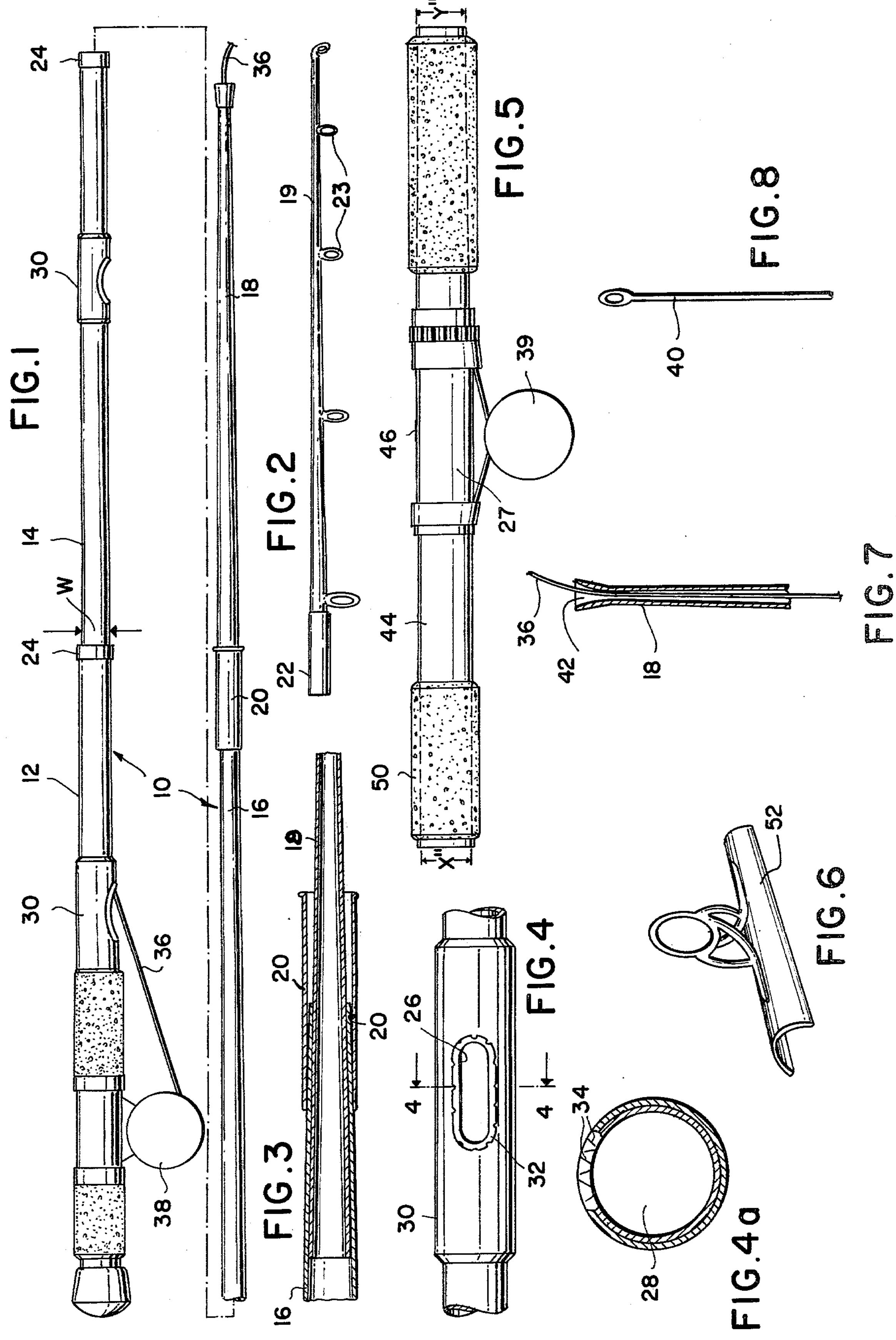
FIG. 1 is a plan view showing the four hollow sections of the inventive rod with the two forward sections dismantled.
FIG. 2 is a plan view of a replacement forewardmost section with line guides provided externally.
FIG. 3 is a fragmented sectional view showing the typical joinder of the two forward sections.
FIG. 4 is a fragmented top plan view of the improved line intake opening, FIG. 4(*a*) is a sectional view taken along line 4—4 of FIG. 4.
FIG. 5 is a plan view of a replacement handle for the rod when it is used as a shorter rod, i.e., when the butt section is removed.
FIG. 6 is a perspective view of the detachable supplementary butt line guide.
FIG. 7 is an elevated sectional view fragmented of the forward hollow tip opening with line therethrough.
FIG. 8 is a typical needle for threading the line through the rod when the line is mono-filament type.

Referring now to the figures of the drawing and particularly to FIGS. 1, 3, 4, 4(*a*), 7 and 8, there is illustrated therein the invention fishing rod 10. It is formed of four sections, the first or butt section 12, the second section 14, the third section 16, and the fourth or tip section 18. A female ferrule 20 is provided at the end of the third section 16 whose function will shortly be shown. A reinforcement sleeve 24 can be provided at the end of the butt section 12 and section 14, which is preferable but also optional. As mentioned earlier, the collapsible, or conversely, the telescopic feature of the fishing rod 10 is conventional. This is accomplished by so tapering the sections that each fits inside the other. In other words the rod 10 is collapsible upon itself for storage inside the butt section 12, or conversely telescopically extendible for use as shown in FIG. 1. This feature is not claimed as part of this invention. The handle on the butt section 12 is permanent, whereas the handles provided for the other sections are removable.

What is claimed, among other things, is the improved line intake opening 26, opening into the hollow chambers 28 of butt section 12 and second section 14. The butt section 12 at this approximate middle portion 30 and similarly at middle portion 30 of the section 14 is of double wall construction. The opening 26 is reinforced by a metal ring 32 which snaps in between the double walls, i.e., at their juncture. Alternating grooves 34 on the ring 32 and on the double wall construction against the ring are filled with a permanent cement to fix the ring securely in the opening. The opening and its metal ring are preferably shaped as an elongated "O" for easier insertion of line therein. Metal ring 32 is flush with the inner and outer rod wall to prevent fraying of the line, no matter in which direction it is pulled through opening 26. In order to thread the line 36 through the hollow rod, after the fly or casting reel 38 is mounted on the butt section 12 the line is threaded through the opening 26 with or without the aid of the threading needles 40 until it emerges from the forwardmost opening 42 at the end of the fourth section 18. With all four sections in extended place the rod is now ready for some "sneak fishing," that is fishing for trout, or the like, in waters in wooded inaccessable areas. The position of the line intake hole on the second section 14 should be far enough forward so that the outside diameter of the double wall enables it to pass freely into the first (butt) section, also that the slip-on handle slides freely over it to its position on the butt of the same section.

To convert the rod to fly casting or surf casting fishing the butt section 12 is removed and the slip-on handle 44 is inserted over the end of the second section 14. Handle 44 is of tubular construction and has a sliding reel seat 46 for mounting the appropriate reel, e.g., fly, spinning or casting, identified here as reference numeral 39. The outside middle portion of the handle accommodates the reel seat, while the hollow chamber 50 is tapered in order to accommodate the ends of the sections it is secured to. Thus, the inside diameter "X" must be the same as the outside diameter of that portion of the section where it slips on, tapering down to inside diameter "Y."

To convert the rod to a standard fly or spinning rod the second section 14 is removed and the slip on handle 44 (this time a smaller version) is inserted over the end of the third section. Now since the second section is gone there is no opening for insertion of line, therefore, we substitute a standard fourth section 19 with appropriate external line guides 23. A male ferrule 22 is provided for locking insertion into female ferrule 20 at the end of third section 16. A conventional supplementary butt line guide 52 is tapeable to the forward half of the third section 16, about 2' from the reel to work as an addition to line guides 23, and also in front of portion 30 of the second section 14, for better line control. The fishing rod is now like any other standard fly or spinning rod.

Now to store the fishing rod the handle is removed, the butt line guide 52 taken off and all sections stored in the butt section 12 (with the exception of standard fourth section 19).

What is claimed is:

1. In a versatile fishing rod collapsible upon itself for storage or telescopically extendible for use including a plurality of tapered hollow sections, a first butt section, a second section, a third section, and a fourth tip section, a reel with line affixable to said butt section the improvement which comprises providing a double wall construction in a generally central position in at least said butt section and a reinforced elongated line intake opening through said double wall leading into the hollow of said butt section, said line passable through said line intake opening and emergable at an opening in the end of said fourth tip section, and wherein a removable handle is provided for said second and third sections and a double wall construction is provided in a generally central position in said second section and a reinforced elongated line intake opening through said double wall leading into the hollow of said second section, said line passable through said line intake opening and emergable at said opening in said end of said fourth tip section.

2. The fishing rod according to claim 1 wherein said reinforced elongated line intake opening further comprises an elongated metal ring shaped to fit into said opening and be mountable between said double wall.

3. The fishing rod according to claim 1 wherein said handle is of tubular construction defining a tapered hollow chamber within and has a sliding reel seat for mounting said reel with line, the outside diameter of said tube being of even cross-section, the hollow chamber being tapered to accommodate the ends of the respective section it is fitted over.

4. The fishing rod according to claim 2 wherein alternating complementary grooves are provided on said ring and on said double wall, respectively, fillable with a bonding material, said ring being flush with the inside and outside surface of said double wall.

5. The fishing rod according to claim 4 wherein a fourth tip section having external line guides is substituted for said hollow fourth tip section.

* * * * *